UNITED STATES PATENT OFFICE.

FRANCIS J. BOLTON AND JAMES A. WANKLYN, OF WESTMINSTER, COUNTY OF MIDDLESEX, ENGLAND.

PROCESS OF PURIFYING GAS.

SPECIFICATION forming part of Letters Patent No. 248,632, dated October 25, 1881.

Application filed July 23, 1881. (No model.) Patented in England March 16, 1881.

*To all whom it may concern:*

Be it known that we, FRANCIS JOHN BOLTON, lieutenant-colonel, and JAMES ALFRED WANKLYN, professor of chemistry, citizens of England, both residing at Westminster, in the county of Middlesex, England, have invented a new and useful Process of Purifying Gas, (for which we have obtained a Patent in Great Britain, No. 1,148, bearing date March 16, 1881,) of which the following is a specification.

In the process of gas manufacture, as commonly carried out, the crude gas, after depositing the tar and the water accompanying the tar, is washed with water in scrubbers and afterward passed through purifiers charged with lime or oxide of iron, or both lime and oxide of iron.

By our new process we substitute for the costly scrubbers a purifier or purifiers charged with a porous solid material which absorbs the ammonia and likewise assists in purifying the gas in the same manner as the lime and oxide of iron, which are therefore to some extent dispensed with. The most essential properties of the porous solid which we use are that, while it does not attack those hydrocarbons to which the illuminating power of gas is due, it is capable of readily absorbing and retaining large quantities of ammonia. The substance which possesses these properties in a high degree and appears to be most suitable, is a mixture of sulphate of lime with phosphate of lime, which may also with advantage contain a little phosphate of iron. Such a mixture is to be met with in commerce under the designation "superphosphate." But before we can use it we have to make sure that it contains no free sulphuric acid, and this can be accomplished by adding to it some of the ammoniacal liquor which accompanies the tar and then exposing it to the air. A proper mechanical condition and suitable degree of hydration (thirty to forty per cent.) are likewise essential.

The advantages which we gain by our improvement are, first, an increase of illuminating power arising from the diminution of the quantity of water brought into intimate contact with the gas; second, an increase in the purity of the gas; third, diminution in the cost of plant; fourth, an increase in the quantity of ammonia extracted from gas, and we get the ammonia in a more compact and available form than at present.

The superphospha'e, after the absorption of the ammonia, becomes valuable as a manure, and forms a substitute for guano; but before using it as a manure it is desirable to destroy the sulpho-cyanides which it contains. This we accomplish by mixing it with a quantity of strong sulphuric acid—about one-fifth of its weight of sulphuric acid is sufficient for the purpose.

We are aware that McDougall proposed a method of removing ammonia from coal-gas, consisting of the use of acid superphosphate— that is, superphosphate containing free sulphuric acid. His experiments proved, however, that instead of being useful the application of this substance was injurious to the gas, because the free acid destroyed the light-giving constituents of the gas, and consequently this method was perfectly useless and has never been applied.

Up to the present time it was always usual to treat gases containing ammonia with sulphuric or hydrochloric acid in order to bind the ammonia, whereas, according to our present invention, we take special care that such acids shall not be present.

Having thus described the nature of our invention, and in what manner the same is to be performed, we do not claim the use of acid superphosphate of lime for the purification of coal-gas; but

We claim—

The described method of removing ammonia from coal-gas by the dry way, by causing the gas to pass through a porous mixture of sulphate of lime and phosphate of lime from which the free acid has been removed.

In testimony whereof we have signed our names to this specification, in the presence of two subscribing witnesses, this 4th day of July, A. D. 1881.

FRANCIS JOHN BOLTON.
JAMES ALFRED WANKLYN.

Witnesses:
CHARLES DENTON ABEL,
OLIVER IMRAY.